Patented Mar. 16, 1954

2,672,477

UNITED STATES PATENT OFFICE 2,672,477

PROCESS FOR PREPARING UNSATURATED NITRILES

Heinz Heinemann, Drexel Hill, Pa., assignor to Houdry Process Corporation, Wilmington, Del., a corporation of Delaware No Drawing. Application February 16, 1951, Serial No. 211,435

10 Claims. (Cl. 260—465.9)

This invention relates primarily to a process for preparing unsaturated nitriles. These compounds are of interest in the production of plastics and as intermediates in organic chemical industry.

It has been proposed to produce unsaturated nitriles by reacting formaldehyde with an alkyl or arylalkyl cyanide or nitrile saturated in the alkyl group, in the presence of a dehydration catalyst.

I have now found that it is possible directly to obtain unsaturated nitriles without the use of formaldehyde by reacting at elevated temperature and in the presence of a dehydration catalyst a saturated alkyl nitrile with an olefin oxide, particularly with ethylene oxide or propylene oxide. These olefin oxides are very easily accessible and, therefore, inexpensive as they can be obtained in large yields and at low costs by catalytic oxidation with air or the like of the corresponding olefins, such as ethylene and propylene abundantly available in the petroleum industry.

Other unsaturated compounds containing other electronegative groups instead of the cyan or nitrile group, can be obtained by the same method from the corresponding electronegative compounds having saturated alkyl groups but containing at least two carbon atoms less in the alkyl chain, by catalytic treatment with olefin oxides. Among such other saturated compounds containing one or more electronegative groups in the molecule which can be treated by this method are included oxo- and/or carbonyl-containing compounds, such as ketones, esters, keto-esters, and the like.

Thus, it is an object of my present invention to produce unsaturated aliphatic and arylalkyl nitriles and other unsaturated aliphatic and arylalkyl electronegative compounds from saturated organic nitriles, or corresponding compounds containing another electronegative group instead of the nitrile group, and having at least two carbon atoms less in the aliphatic chain than the unsaturated compounds to be produced.

And it is another object of the invention to produce by a single reaction step such unsaturated electronegative compounds, particularly unsaturated nitriles, from saturated organic nitriles, or the like electronegative organic compounds having at least two carbon atoms less in the alkyl group than the compound to be produced.

It is a still further object of the invention to produce unsaturated aliphatic or arylalkyl nitriles in an inexpensive manner and by a single step from easily accessible starting materials.

Still other objects and advantages of the invention will appear from the following specification and the claims.

An easy and inexpensive method for the production of unsaturated organic nitriles, and the like, is very desirable as such unsaturated electronegative organic compounds are highly valuable in the production of plastics and the like, particularly by polymerization and copolymerization reactions. If desired, unsaturated nitriles can be converted into the corresponding acids valuable, too, for such purposes.

The new method of producing unsaturated aliphatic or arylalkyl nitriles and the like is useful in the production of all such compounds which contain apart from the cyano group at least three aliphatic carbon atoms in a straight chain, such compounds being prepared from saturated organic nitriles or the like having at least one methyl or methylene group ($-CH_3$ or $CH_2-$) in the molecule. Thus, acetonitrile ($CH_3CN$) is the lowest homologue of the organic nitrile compounds to be employed for the production of unsaturated nitriles according to this invention. But any of the higher aliphatic nitriles can be employed which contain at least one methyl or methylene group in their molecule, also such with side chains. Arylakyl nitriles containing at least one such group, e. g. tolunitriles, can also be used.

Any olefin oxide, particularly the readily available ones, such as ethylene oxide and propylene oxide, can be employed for the preparation of the unsaturated nitriles and the like from organic nitriles of the above indicated type containing at least two carbon atoms less in the molecule than said unsaturated nitriles to be produced, the total number of carbon atoms in the molecule of the unsaturated nitrile or the like being equal to the sum of the carbon atoms of the reacting saturated nitriles or the like and the olefin oxides, combined. Thus, the reaction taking place in one of the simplest cases, i. e. in the production of allylcyanide, is represented by the following equation:

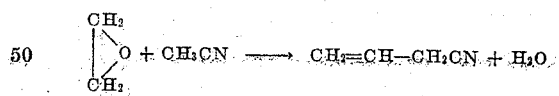

Isomers can be, and generally are, formed simultaneously in the reaction, such as, in the case of the reaction above mentioned: crotonic nitrile $CH_3$—$CH$=$CHCN$, and methacrylonitrile $CH_2$=$C(CH_3)CN$.

Solid dehydration catalysts acn be employed in the process of this invention, such as activated alumina, silica-gel, or silica-alumina, and other adsorption type catalysts.

Elevated temperatures are employed in carrying out the process, the height of the temperatures required or suited best depending, on the one hand, on the type and amount of catalyst used and, on the other hand, on the special reactants employed. It is to be noted, however, that the reaction is highly exothermic, and that in some cases the temperature in the reactor rises gradually throughout the run by as much as 300° F., and more, so that corresponding cooling of the reaction mixture during the reaction can become advisable, to maintain the temperature on a predetermined optimum level and to prevent formation of substantial amounts of undesirable by-products. Temperatures in the approximate range of 300° to 800° F. are suitable, and a temperature of about 600° F. has proved particularly useful in many cases. The above mentioned automatic rise in temperature, at least in part, appears to be due to side-reactions.

Another possibility for the formation of undesirable by-products arises from the fact that olefin oxides tend to polymerize. To restrict or inhibit such side-reactions, it is advisable either to add some polymerization inhibitor, or to dilute the reactant mixture by a diluent inert under the prevailing reaction conditions. The use of a substantial molecular excess of the saturated nitrile over the olefin oxide employed is also useful for this purpose. Suitable polymerization inhibitors are for example all those known for this purpose, such as phenols, aminophenols, their homologues and derivatives, e. g. beta-naphthol and beta-naphthylamine; antimony tri and penta-chloride; arsenic tri and penta-chloride; potassium bismuth iodide; and so on. Nitrogen, flue gas or the like can, for example, be added as a suitable diluent. Such diluents, polymerization inhibitors, or the like are recommended also to reduce the polymerization tendency of the unsaturated nitriles formed. Cooling, polymerization inhibitors, use of an excess of saturated nitrile, and/or addition of a diluent can also be combined, if desired.

The following illustrative examples relating to the production of the lowest possible members of the series of unsaturated nitriles in accordance with the invention, are typical and particularly important from a practical point of view:

Example I

Acetonitrile is charged by gravity flow to a pre-heated reaction-chamber held at atmospheric pressure and at a temperature of about 600° F. and containing an active alumina catalyst. Ethylene oxide is passed through a flow meter into the reaction chamber at a liquid space velocity of 0.5 volume of liquid per hour per volume of catalyst (v./hr./v.) and to an amount of about 1 mole ratio of ethylene oxide to 1 mole acetonitrile. The temperature in the reaction chamber gradually rises throughout the run, without further external heating, once the run has started. The reaction effluent is condensed in several stages, e. g. first by water, then by ice, and finally by Dry Ice. The liquid product thus obtained is subjected to fractional distillation. Apart from unchanged acetonitrile, a mixture of allyl cyanide, $CH_2$=$CH$—$CH_2CN$, B. P. 118-9° C., crotonic nitrile, $CH_3$—$CH$=$CHCN$, B. P. 117-8° C., and some methyl acrylo nitrile $$CH_2=C(CH_3)CN$$

B. P. 90-2° C., is obtained and can be separated into its components. The bottoms fraction of the distillation contains polymerization products.

The formation of such polymerization products can be substantially reduced or inhibited by the use of cooling means to prevent a rise of temperature during the reaction or to keep such rise rather low. The same result can be obtained by using a substantial molecular excess of acetonitrile over the ethylene oxide employed, or by adding a diluent inert under the reaction conditions, or by adding copolymerization inhibitor, for example of the kind mentioned before. Still better results in the yield of the desired unsaturated nitriles are obtained by combining these methods of reducing or inhibiting at least in part the formation of polymerization products.

Example 2

The same reagents as in Example 1 are employed but with the use of a silica-alumina catalyst at a temperature of about 400° F. and a liquid space velocity of 2 v./hr./h., all other conditions being maintained about the same as in the first example. With some differences in yields the same type of products were obtained as in the previous example.

Example 3

Acetonitrile is reacted with propylene oxide in the presence of an active alumina catalyst at a temperature of about 600° F. and a liquid space velocity of 1 v./hr./v., a molar ratio of acetonitrile to propylene oxide (1:1) being employed. The propylene oxide is charged to the reaction chamber in admixture with the acetonitrile. Otherwise the conditions are maintained similar to those given in Example 1. The resulting reaction product consists substantially of 4-pentene nitrile.

Higher saturated nitriles can be employed instead of the acetonitrile in all three examples, such as propionitrile, butyronitrile, and the like, to form unsaturated nitriles having a number of carbon atoms corresponding to the sum of carbon atoms of the saturated nitrile and the olefin oxide combined.

Numerous modifications and variations of the invention as hereinbefore set forth can be made without departing from the spirit and scope of the invention.

I claim as my invention:

1. A process for the production of unsaturated organic nitriles from saturated organic nitriles having at least two carbon atoms less in the molecule than the unsaturated nitriles to be produced, comprising reacting such saturated organic nitrile with an olefine oxide at elevated temperature and in the presence of a solid adsorbent type dehydration catalyst, the CN group of said saturated nitrile being attached to an acyclic carbon atom containing at least two hydrogen atoms.

2. A process for the production of unsaturated organic nitriles from saturated organic nitriles having at least two carbon atoms less in the molecule than the unsaturated nitriles to be produced, comprising reacting such saturated organic nitrile with an olefine oxide, at atmospheric pressure and at a temperature in the range of 300° to 800° F. in the presence of a solid adsorbent type dehydration catalyst, the CN group of said saturated nitrile being attached to an acyclic carbon atom containing at least two hydrogen atoms.

3. A process for the production of unsaturated organic nitriles from saturated organic nitriles having at least two carbon atoms less in the molecule than the unsaturated nitriles to be produced, comprising reacting an olefine oxide with a substantial molecular excess of such saturated organic nitrile, at elevated temperature and in the presence of a solid adsorbent type dehydration catalyst, the CN group of said saturated nitrile being attached to an acyclic carbon atom containing at least two hydrogen atoms.

4. A process for the production of unsaturated organic nitriles from saturated organic nitriles having at least two carbon atoms less in the molecule than the unsaturated nitriles to be produced, comprising reacting an olefine oxide with such saturated organic nitrile, at elevated temperature in the presence of a solid adsorbent type dehydration catalyst and in the presence of a polymerization inhibitor, the CN group of said saturated nitrile being attached to an acyclic carbon atom containing at least two hydrogen atoms.

5. A process for the production of unsaturated organic nitriles from saturated organic nitriles having at least two carbon atoms less in the molecule than the unsaturated nitriles to be produced, comprising reacting an olefine oxide with such saturated organic nitrile, at elevated temperature in the presence of a solid adsorbent type dehydration catalyst and in the presence of a diluent inert under the reaction conditions, the CN group of said saturated nitrile being attached to an acyclic carbon atom containing at least two hydrogen atoms.

6. A process for the production of butene nitriles comprising treating acetonitrile with ethylene oxide at elevated temperature in the presence of a solid adsorbent type dehydration catalyst, and recovering the butene nitriles formed from the reaction effluent.

7. A process for the production of butene nitriles comprising treating ethylene oxide with a substantial molecular excess of acetonitrile under atmospheric pressure at a temperature in the range of about 400° to 700° F. in the presence of an active alumina catalyst, and recovering the butene nitriles formed from the reaction effluent.

8. A process for the production of pentene nitriles comprising treating acetonitrile with propene oxide at elevated temperature in the presence of a solid adsorbent type dehydration catalyst, and recovering the pentene nitriles formed from the reaction effluent.

9. A process for the production of pentene nitriles comprising treating propene oxide with a substantial molecular excess of acetonitrile under atmospheric pressure at a temperature in the range of about 400° to 700° F. in the presence of an active alumina catalyst, and recovering the pentene nitriles formed from the reaction effluent.

10. A process for the production of unsaturated organic nitriles from saturated organic nitriles having at least two carbon atoms less in the molecule than the unsaturated nitriles to be produced, comprising reacting such saturated organic nitrile with an olefine oxide, at atmospheric pressure and at a temperature in the range of 300° to 800° F. in the presence of a solid adsorbent type dehydration catalyst, and cooling the reaction mixture during the reaction to a degree to prevent substantial increase of temperature by exothermic heat development, the CN group of said saturated nitrile being attached to an acyclic carbon atom containing at least two hydrogen atoms.

HEINZ HEINEMANN.

References Cited in the file of this patent

UNITED STATES PATENTS

| Number | Name | Date |
|---|---|---|
| 2,364,422 | Brooks | Dec. 5, 1944 |

OTHER REFERENCES

Pakendorf et al., Chem. Abstracts, vol. 35, col. 3627 (1941).